United States Patent [19]

Fragas

[11] 4,199,612
[45] Apr. 22, 1980

[54] CORN POWDER PREPARATION

[76] Inventor: Restituto R. Fragas, 3027 Glenwood Pl., Southgate, Calif. 90280

[21] Appl. No.: 840,702

[22] Filed: Oct. 11, 1977

[51] Int. Cl.$^2$ .............................................. A23L 1/195
[52] U.S. Cl. .................................... 426/622; 426/640; 426/472; 426/481
[58] Field of Search ............... 426/622, 472, 473, 481, 426/518, 640, 627, 469

[56] References Cited

U.S. PATENT DOCUMENTS

| | | | |
|---|---|---|---|
| 1,334,366 | 12/1918 | Garza | 426/622 |
| 1,782,960 | 11/1930 | Eripin et al. | 426/469 |
| 2,584,893 | 2/1952 | Lloyd et al. | 426/622 |

OTHER PUBLICATIONS

*Cereals as Food and Feed*, Matz, Air Publishing Co., Inc., Westport, Conn. 1959, pp. 214–216.

*Primary Examiner*—Raymond N. Jones
*Assistant Examiner*—Elizabeth A. Hatcher
*Attorney, Agent, or Firm*—W. Britton Moore

[57] ABSTRACT

A method for preparing corn powder in which corn is picked approximately 30 days before becoming field dried, cut from the cob, heated until dried, air blown to separate light particle residue created during heating, and ground to a consistency between that of commercially available coarse cornmeal and fine corn powder.

4 Claims, 1 Drawing Figure

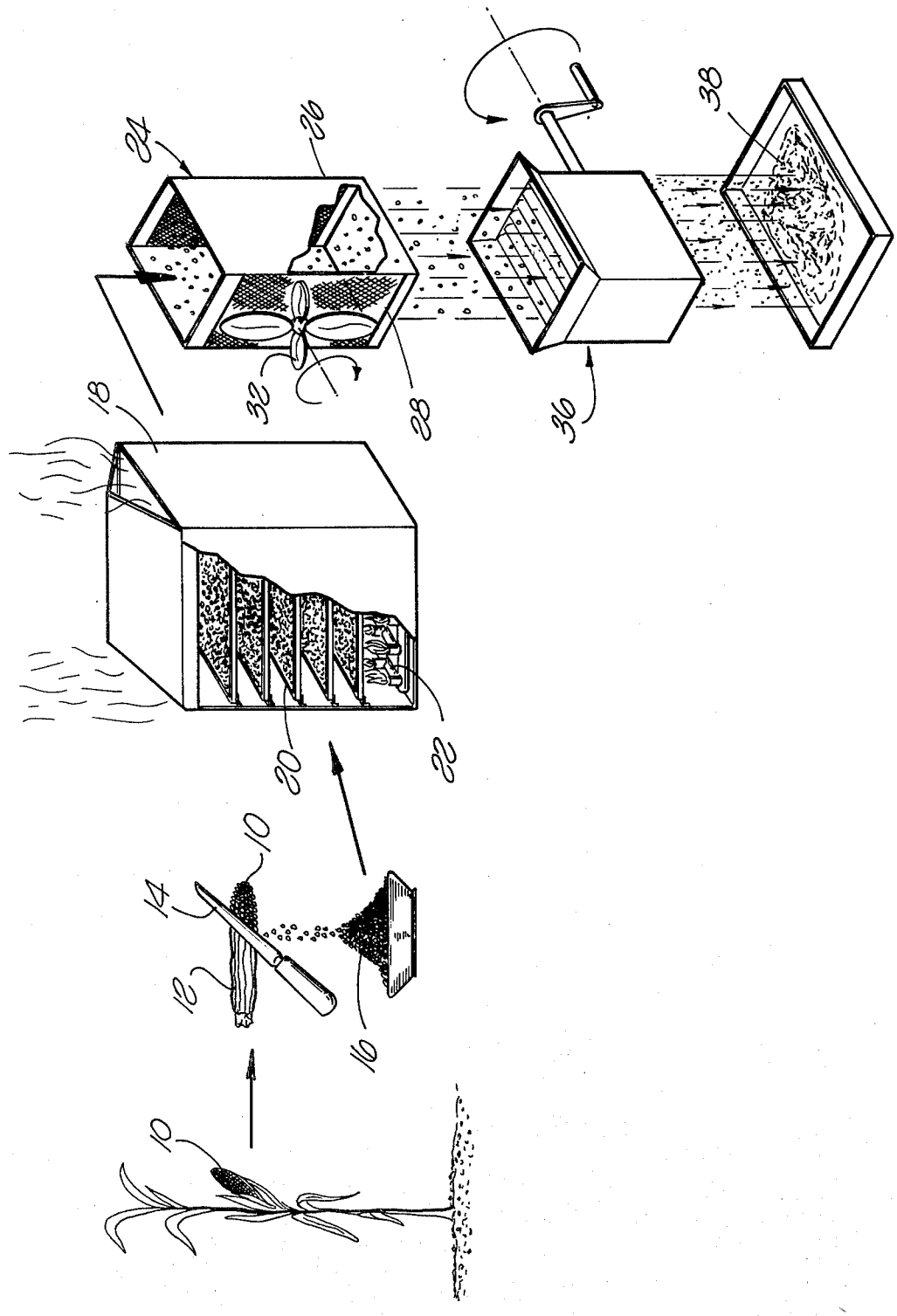

CORN POWDER PREPARATION

FIELD OF THE INVENTION

The invention relates to methods for preparation of corn powder.

BACKGROUND OF THE INVENTION

Typically there are three types of cornmeal commercially available today. The first type is a coarse meal which is generally prepared by picking corn which has been field dried, and then grinding the corn to a coarse consistency. Field dried corn used for this purpose typically consists of three varieties designated at 90 day corn, 110 day corn, and 120 day corn, the days referring to the time between planting and the matured corn having dried on its stalk prior to picking. The second type, powdered cornmeal, is generally prepared in the same way as the coarse meal except it is put through a sieve sized so that only fine powdered corn can pass through. A third type of cornmeal consists of a frozen mixture of the powdered cornmeal described above and water. These three types of cornmeal all contain a flake-like covering which partially surrounds each kernel of corn and which is ground up with the corn during the cornmeal preparation process. These flakes have a taste objectionable to some and impart this sometimes objectionable taste to the cornmeal. Use of the above three types of cornmeal is typified in the preparation of tamales wherein both the powdered and the coarse are mixed with water and required to sit for approximately two hours. When using the frozen meal, mixture with the powdered meal and a setting time is also required. There has long been a need to have a commercially available corn powder which does not contain the above described flakes and is ground to a consistency so that it can be mixed with water and immediately used.

SUMMARY OF THE INVENTION

The present invention discloses a method for preparing corn powder not having the above described disadvantages. The method consists of picking the corn when it contains between 35 and 45 percent fluids by weight which typically occurs between about 20 to 32 days before it becomes field dried. The corn is then removed from its cob and heated until it becomes dried. During this heating process the flake-like coverings surrounding the kernels separate and form a residue. The corn and its residue is then separated and the thus obtained pure corn ground to a consistency between that of coarse cornmeal and fine corn powder.

Corn powder created by this method can be mixed with water and immediately used for its intended purposes such as tamales. This corn powder also has a more pleasing smell to some than cornmeal prepared by traditional processes, and is believed to be more nutritious.

BRIEF DESCRIPTION OF THE DRAWINGS

FIG. 1 illustrates one method for preparing corn powder according to this invention.

DETAILED DESCRIPTION

An embodiment of the invention disclosed herein exemplifies the invention and is currently considered to be the best embodiment for such purposes. However, it is to be recognized that variations within the successive steps can be effected without altering the corn powder produced. Accordingly, the specific method disclosed is representative and provides a basis for the claims which define the scope of the present invention.

The following steps are utilized to prepare corn powder according to this invention. Referring to FIG. 1, corn 10 growing on a stalk is picked and removed from its cob 12 by a cutting blade 14. The thus cut corn 16 is placed in a heating enclosure 18 on trays 20 spaced approximately five inches apart. The trays may be interchanged periodically to obtain uniform drying. A gas flame 22 is used to heat the corn until it becomes dry. As the result of this heating process small flake-like coverings which surround the corn kernels separate and form a residue which is mixed with the corn when removed from the heater 18. The corn is then passed downwardly through a residue separater 24 which consists of an enclosure 26 having openings 28 on opposed sides through which air is blown by a fan 32. As the fan 32 blows the residue from the corn, the corn due to its heavier weight talls out an open bottom and passes through a grinder 36 from which corn powder 38 is obtained.

In operation, it is important that the corn be picked when the corn kernels contain between 35 and 45 percent fluid by weight. This has been found to occur typically when the corn is picked between about 20 and 32 days before being field dried. It has been found particularly satisfactory to pick the corn when the kernels contain about 40 percent fluid by weight, which usually occurs about 30 days before becoming field dried. Depending upon the weather conditions, the actual number of days will, of course, vary. The number of days referred to herein relate to the normal growing cycle for corn of a specified type. The heating chamber 18 is operated at a temperature of between about 125° F. and 150° F. for about 2 to 2½ hours. It has been found that a temperature of about 150° F. for about two hours satisfactorily dries corn containing 40 percent fluid by weight. The corn powder 38 collected from the corn grinder 36 has a texture between that of commercially available coarse cornmeal and fine corn powder.

I claim:

1. A method of preparing corn powder consisting of the steps of
    (a) picking corn at a sufficient time period of the normal growing cycle before being ripened and field dried so that it contains between 35 and 45 percent fluid by weight;
    (b) removing the kernels from their associated cobs;
    (c) heating said separated kernels at a temperature between 125° F. and 150° F. for between 2 and 2½ hours;
    (d) subjecting said heated kernels to an airstream to separate flake-like coverings surrounding the kernels which form a residue, and blowing the residue therefrom; and
    (e) grinding the kernels into a powder having a texture between that of coarse and fine corn powder.

2. The method of claim 1, wherein the kernels are heated in an enclosure.

3. The method of claim 2, wherein the heated kernels are fed into a residue separator having openings in the walls thereof through which said airstream is caused to flow.

4. The method of claim 3, wherein the air blown kernels pass downwardly through said residue separator and are then ground into a powder.

* * * * *